US009449600B2

(12) United States Patent
Bayley

(10) Patent No.: US 9,449,600 B2
(45) Date of Patent: Sep. 20, 2016

(54) CHARACTER DATA ENTRY

(71) Applicant: Plantronics, Inc., Santa Cruz, CA (US)

(72) Inventor: Antony M. W. Bayley, Royal Wootton Bassett (GB)

(73) Assignee: Plantronics, Inc., Santa Cruz, CA (US)

( * ) Notice: Subject to any disclaimer, the term of this patent is extended or adjusted under 35 U.S.C. 154(b) by 383 days.

(21) Appl. No.: 13/915,533

(22) Filed: Jun. 11, 2013

(65) Prior Publication Data

US 2014/0365214 A1    Dec. 11, 2014

(51) Int. Cl.
| | |
|---|---|
| *G10L 15/22* | (2006.01) |
| *G10L 15/26* | (2006.01) |
| *G06F 17/24* | (2006.01) |
| *G06F 3/14* | (2006.01) |
| *G06F 3/16* | (2006.01) |

(52) U.S. Cl.
CPC .............. *G10L 15/26* (2013.01); *G06F 3/1454* (2013.01); *G06F 3/167* (2013.01); *G06F 17/243* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 5,231,670 | A * | 7/1993 | Goldhor ................... | G06F 3/16 704/275 |
| 6,246,981 | B1 * | 6/2001 | Papineni ................. | G10L 15/22 704/235 |
| 7,953,597 | B2 * | 5/2011 | Ativanichayaphong ................... | G06F 17/243 704/235 |
| 2004/0215452 | A1 * | 10/2004 | Pearah ................... | H04R 1/086 704/231 |
| 2006/0064302 | A1 * | 3/2006 | Ativanichayaphong ................... | G06F 17/243 704/235 |
| 2007/0124149 | A1 * | 5/2007 | Shen ....................... | G10L 15/26 704/275 |
| 2010/0245585 | A1 * | 9/2010 | Fisher .................. | H04M 1/6066 348/164 |
| 2013/0162523 | A1 * | 6/2013 | Tomaszewski ....... | G06F 3/1454 345/156 |

OTHER PUBLICATIONS

Bilton, "With Apple's Siri, A Romance Gone Sour," NY Times, found at URL <bits.blogs.nytimes.com/2012/07/15/with-apple's-siri-a-romance-gone-sour/?_r=0>, dated Jul. 15, 2012.
Mallet et al., "AutoHotkey Automation. Hotkeys. Scripting," found at URL <www.autohotkey.com>, on Aug. 27, 2013.
Pash, "Hack Attack: Knock down repetitive email with AutoHotKey," found at URL <http://lifehacker.com/159785/hack-attack-knock-down-repetitive-email-with-autohotkey>, dated Mar. 14, 2006.
Unknown, "KeePass Password Safe," found at URL <keepas.info>, on Aug. 27, 2013.
Unknown, "Nuance Unveils Dragon Naturally Speaking 12, Delivering Unprecedented Accuracy and Speed for Voice Recognition on the PC," found at URL <http://www.businesswire.com/news/home/20120726005722/en/Nuance-Unveils-Dragon-NaturallySpeaking-12-Delivering-Unprecedented>, dated Jul. 26, 2012.
Unknown, "Use text macros on your iPhone and iPad with iOS 5," found at URL <www.mactips.info/2011/10/use-text-macros-on-your-iphone-and-ipad-with-ios-5>, dated Oct. 26, 2011.

* cited by examiner

*Primary Examiner* — Pierre-Louis Desir
*Assistant Examiner* — Yi-Sheng Wang
(74) *Attorney, Agent, or Firm* — Chuang Intellectual Property Law

(57) ABSTRACT

Methods and apparatuses for entry of character data are disclosed. In one example, a user action is received at a headset input user interface. The user action is correlated to a character data previously stored. The character data is transmitted to a host device, the character data configured to be automatically entered in one or more data fields.

20 Claims, 9 Drawing Sheets

600

Speech Content Translation – Correlation of Speech Content to Character Data

| Speech Content | Character Data |
| --- | --- |
| Password 1 | B4768$#A13% |
| Home PC Password | 45target21 |
| Credit Card 1 | 4205100479653985<tab>587<tab>0514 |
| Home Contact Information | John<tab>Smith<tab>510<tab>Pine<space>Street<tab>Seattle<tab>WA<tab>98122 |
| Work Email Password | JohnS<tab>passport342 |
| . | . |
| . | . |
| . | . |

Payment Information

Credit Card Number         Security Code 4205100479653985              587
                802                   804

Expiration Date 0514
       806

FIG. 8

CHARACTER DATA ENTRY

BACKGROUND OF THE INVENTION

In the prior art, computer applications exist that enable a user to define keyboard macros, which are sequences of characters that are auto-typed in response to a specific key press. One example is AutoHotKey, which provides general-purpose scriptable desktop automation with hotkeys for the Microsoft Windows operating system. Some operating systems (OS) have built-in keyboard macro capabilities. For instance iOS allows the user to define keyboard shortcuts.

KeePass is a password manager application, which stores online usernames and passwords in a database. Selecting a menu item associated with one of the database records causes the stored username and password to be auto-typed into any web form that is open. KeePass is available on all the major desktop operating systems (Windows, OS-X and Linux) and on many mobile devices (iOS, Android, Windows Phone 7, Blackberry, J2ME).

These applications and OS have several disadvantages. For example, these applications rely on the user interacting with software running on the host device via keyboard, mouse and menus. Both AutoHotKey and KeePass require the application and its configuration data to be installed on the computer. In some cases, such as when a computer is shared by several users, it may not be desirable to install personal information like passwords on it. Anyone who has physical access to the computer is able to copy the data. AutoHotKey scripts are plain text files, so provide no security at all. iOS keyboard shortcuts are equally insecure. KeePass stores passwords in an encrypted database that requires a master password to view, but information is still stored on the computer. When using KeePass, an unauthorized user could guess the master password, or be watching the authorized user when he or she types it.

As a result, improved methods and apparatuses for entry of character data are needed.

BRIEF DESCRIPTION OF THE DRAWINGS

The present invention will be readily understood by the following detailed description in conjunction with the accompanying drawings, wherein like reference numerals designate like structural elements.

FIG. 6 is a table illustrating translation of user speech content to character data.

FIG. 8 is a display screen illustrating automatic character data entry into data fields in a further example from the table shown in FIG. 6.

DESCRIPTION OF SPECIFIC EMBODIMENTS

Figure 1:
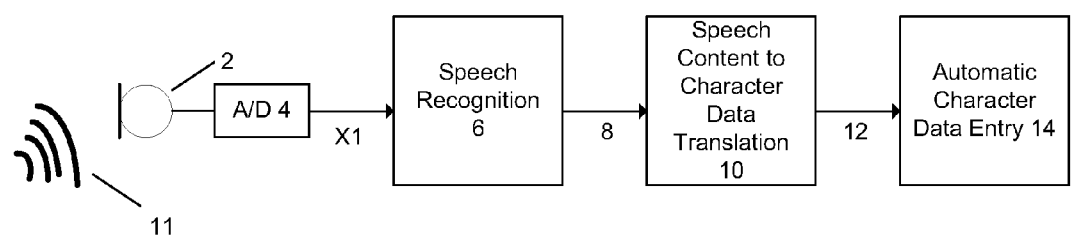
FIG. 1 illustrates a system for character data entry in one example.

Methods and apparatuses for entry of character data are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, one or more non-transitory computer-readable storage media have computer-executable instructions stored thereon which, when executed by one or more computers, cause the one more computers to perform operations including receiving a user speech at a microphone and recognizing a content of the user speech. The operations include correlating the content to a character data previously stored in a memory, and automatically entering the character data in one or more data fields.

In one example, a method for operating a headset as a keyboard includes receiving a user action at a headset input user interface, and correlating the user action to a character data previously stored in a headset memory. The method includes transmitting the character data to a host device, the character data configured to be automatically entered in one or more data fields.

In one example, a device includes a communications interface, a microphone configured to detect a user speech, and a processor. The device includes a memory, where the memory includes a word or phrase paired with a character data and an application. The application is configured to transmit a human interface device protocol keyboard data over the communications interface to a computing device, wherein the application is further configured to transmit a human interface device protocol keyboard data corresponding to the character data following detection of the word or phrase in the user speech paired with the pre-determined character data.

In one example, one or more non-transitory computer-readable storage media have computer-executable instructions stored thereon which, when executed by one or more computers, cause the one more computers to perform operations including receiving a user speech at a microphone, and recognizing a content of the user speech. The operations further include correlating the content to a character data previously stored in a memory, and transmitting the character data as a human interface device keyboard usage data.

In one example, a device includes a communications interface, a microphone configured to detect a user speech, a processor, and a memory. The memory includes a speech recognition application configured to recognize a speech content from the user speech, and a human interface device keyboard emulation application configured to transmit a human interface device protocol keyboard data over the communications interface to a computing device. The application is further configured to transmit a human interface device protocol keyboard data corresponding to the speech content over the communications interface to a computing device. For example, the device may be a Bluetooth headset, USB headset, or mobile phone.

In one example embodiment, a human interface device (HID) keyboard is embedded in another device, such as a USB or Bluetooth headset. Speech commands, or other user-interface (UI) actions such as motion, proximity or touch gestures, make the embedded keyboard auto-type stored text strings into web forms or documents on the smartphone or computer to which the headset is connected. Advantageously, the device with the embedded HID keyboard is compatible for use with any computer application that accepts normal keyboard data entry.

One example application is entering username/pas sword or contact details into a web form. For example, a user would speak a predefined phrase like "password 1" to auto-type his webmail username and password, without revealing them to onlookers who are listening or watching. The auto-typed text string can include TAB, or other non-printing characters, to navigate between different data fields on the web-form. Thus a single stored text string can be used to fill in an entire web form consisting of multiple text-input boxes.

In one example, USB, Bluetooth, and several other corded and wireless communication protocols implement the Human Interface Device (HID) protocol, which defines standard profiles for devices such as keyboards and mice. Many Bluetooth or USB headsets that include a user-programmable processor could add HID keyboard functionality in embedded software, with no additional hardware cost.

An embedded keyboard can be implemented in other devices that include a user-programmable processor and have a USB, Bluetooth or other communications interface that supports the HID protocol. For example corded headset adapters or headset charging cases may be used. The methods and systems described herein are also applicable to non-headset products in further examples. For example adding a microphone and speech recognition engine to a regular computer keyboard would enable it to auto-type user defined text strings in response to speech commands.

Furthermore, in various examples, the methods and systems can be implemented purely in software, to run on any desktop or mobile operating system, using the platform's standard microphone input device. In this case the keyboard emulation would be implemented in application software, or as a driver module, instead of as a HID.

As used herein, the term "speech-controlled keyboard" refers to any of the implementations described above, where automatic text entry by an emulated keyboard is controlled by speech input or other UI action. As described, there are multiple incarnations of the speech-controlled keyboard. Examples include:

(1) A speech-controlled keyboard embedded in an accessory that is connected to a host computer or mobile device using an interface that implements the HID protocol, like USB or Bluetooth. In this case the speech-controlled keyboard appears to the host to be a standard HID keyboard device. There is no physical keyboard. Text cannot be manually typed, but rather generated automatically by the accessory's software.

(2) A speech-controlled keyboard implemented in software on a host computer or mobile device, and using the host's own speech input or other UI functionality. In this case the software application or service emulates system key press events in software.

(3) A hybrid system where some of the speech-controlled keyboard's functionality is implemented in the host and some in the connected accessory. For example the accessory might detect a speech command or other UI action and signal this to the host computer or mobile device using a proprietary protocol. Software on the host would act on this signal to emulate system key press events.

The methods and systems described herein offer a variety of advantages. For example, the methods and systems allow a user to enter long, secure passwords to login to online services, without having to remember and manually type the password. The methods and systems offer the user the ability to enter passwords to login to online services, without revealing the password to anyone who is listening or looking at what is typed. Security is enhanced when logging into password protected services in a public place.

In certain examples, the methods and systems automate the entry of commonly requested blocks of text, e.g., the user postal address, into web forms, applications and documents. This helps the user fill in forms faster and prevents typing errors. In an embodiment using speech recognition, the methods and systems offer a quicker and easier method than manual entry of text on a keyboard, or cutting and pasting stored passwords from a password manager application. This is particularly true in comparison to manual entry on the small keypad of a mobile device. Certain devices may have only one or two depressible buttons or no keypad whatsoever. Furthermore, certain examples described herein can be implemented in software on many Bluetooth and USB products without any additional hardware cost.

FIG. 1 illustrates a system for character data entry in one example. The character data entry system may be a distributed system. Components of the character data entry system may be implemented on a single device or across several devices, including cloud based implementations. Although shown as separate blocks, the functionality performed by the system components may be integrated into a single functional system.

The character data entry system includes a microphone 2, analog-to-digital (A/D) converter 4, speech recognition system 6, speech content to character data translation system 10, and automatic character data entry system 14. Although only a single microphone 2 is illustrated, in a further example an array of two or more microphones may be used. The output of microphone 2 is coupled to analog-to-digital converter 4, which outputs a digital sound signal X1 to speech recognition system 6.

In the example shown in FIG. 1, microphone 2 detects sound 11 corresponding to a user speech. The analog signal output from microphone 2 is input to A/D converter 4 to form the digital user speech signal X1. In a further example, digital user speech signal X1 is output directly from a digital micro-electrical-mechanical system (MEMS) microphone. User speech signal X1 is input to speech recognition system 6 for processing. Speech recognition system is operable to recognize words or phrases in the user speech signal X1.

Speech recognition system 6 processes signal X1 to recognize a speech content 8. For example, speech recognition system 6 converts the user speech to text using speech recognition. Speech recognition system 6 outputs the speech content 8 to speech content to character data translation system 10.

Speech content to character data translation system 10 processes speech content 8 by translating the speech content 8 to a character data 12. In this manner, the speech content 8 is correlated to a character data 12. For example, the character data 12 may be a text data, an alphanumeric character data, or equivalent. The character data 12 has been previously stored in memory. Automatic character data entry system 14 automatically enters the character data 12 in one or more data fields. For example, the data fields may be associated with an application such as a web browser displaying web pages on a display device, the web pages having data fields to be filled in. In one example implementation, automatically entering the character data in the one or more data fields includes emulating a keyboard input to automatically type the character data.

In one example, automatic character data entry system 14 receives the character data 12 from a device implementing a Universal Serial Bus (USB) Human Interface Device Protocol or a Bluetooth Human Interface Device Profile. For example, the device is a Bluetooth headset operable as a Bluetooth human interface device with keyboard usage functionality to output the character data as a keyboard output. In a further example, the device is a headset operable as a USB human interface device with keyboard usage functionality to output the character data as a keyboard output.

In one example, the character data is a first character string to be automatically entered into a first data field and a second character string to be automatically entered into a second data field. In one example, the character data is a password. In a further example, the character data is a first character string corresponding to a user name, a TAB key press keyboard command, and a second character string corresponding to a user password.

In one example, speech content to character data translation system 10 is implemented on a headset. In a further example, speech content to character data translation system 10 may be implemented on a variety of other devices designed to receive user input. Example devices include mobile phones and personal computers.

Figure 2:
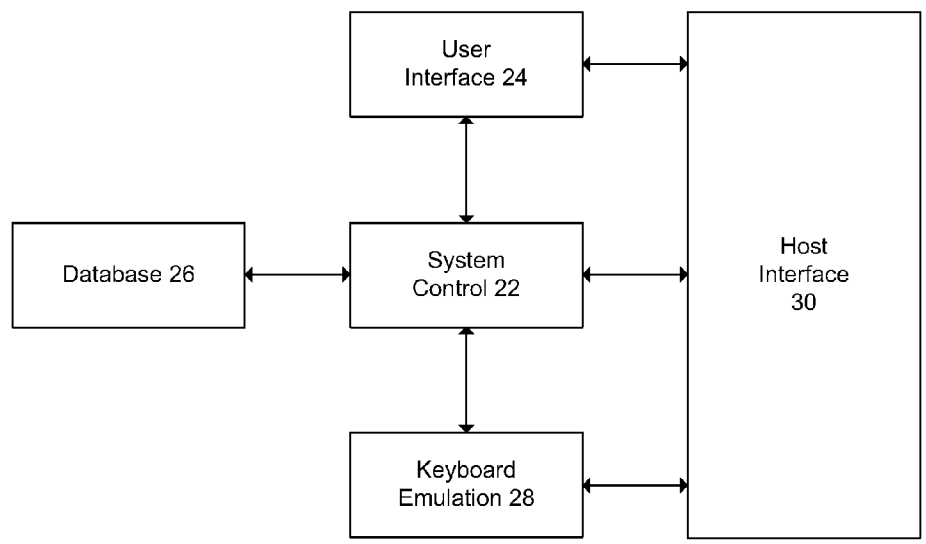
FIG. 2 illustrates a simplified block diagram of a generic embedded keyboard device in one example.

FIG. 2 illustrates a simplified block diagram of a generic embedded keyboard device 20 in one example. The generic embedded keyboard device 20 includes a system control block 22, user interface (UI) 24, database 26, keyboard emulation block 28, and host interface 30. Illustrated is a generic system architecture, which applies to the specific examples described herein.

Any of the functional blocks may be implemented either on the host system, or in an attached accessory, or may be distributed between the two. In some cases the functions could be further distributed. For example, the user interface 24 could be implemented as a web application, accessed with a web browser, or the speech recognition function could be implemented remotely as a cloud service.

The host interface 30 connects the emulated keyboard to the desktop computer or mobile device that is the destination for the auto-typed text. In certain examples the host interface 30 is a Bluetooth wireless link or a USB port. However it could be any communications link using a protocol that supports keyboard functionality (PS/2, ZigBee, I2C, etc.).

Alternatively, a speech-controlled keyboard is implemented purely as a software application or service running on a desktop computer or mobile device. In this scenario, the host interface 30 consists of the operating system's Application Programming Interface (API) and device driver interfaces.

The user interface 24 fulfills two roles. First, the user interface 24 triggers the emulated keyboard to auto-type stored text strings. The trigger event may be recognition of a defined phrase by a speech-input device, or some alternative event like a button press, motion, proximity or touch gesture. Second, the user interface 24 enables the system to be configured, by defining a series of speech commands or other user interface inputs that will trigger auto-typing, and the corresponding text-strings to be typed.

In some cases the hardware accessory in which the keyboard is embedded may provide the user interface 24, such as buttons, touch sensors or speech input/output. In other cases the user interface 24 may be implemented as an application running on an attached desktop computer or mobile device.

Although speech control is not the only way to trigger auto-typing of stored text, speech control is particularly advantageous. Speech recognition, speech-to-text and speech control are mature technologies. In one example, user speech commands at a headset trigger auto-typing of passwords: For example "password 1", "password 2", . . . "password 10".

The system control block 22 processes inputs and generates outputs to implement the speech-controlled (or other UI controlled) keyboard functionality. It is typically implemented in embedded software running on a microcontroller or similar device, but could alternatively be implemented in electronic hardware or in software running on the desktop computer or mobile device to which text input is being provided.

There are two distinct system control block 22 functions: (1) System configuration: Enable the user to define text strings and associate them with speech phrases or UI actions that will trigger them to be typed. Store the configuration settings in the database 26, and (2) Run-time: Detect the speech phrases or UI actions that trigger auto-typing, retrieve the associated text strings from the database 26, and emulate the key press events needed to generate the text.

The database 26 stores the speech commands, or other UI events, that cause auto-typed text to be generated, and the corresponding text strings. In most cases there will not be many database entries, so the most appropriate storage mechanism is a list, array, dictionary or other simple data structure in the device's memory or file system. However any other suitable data storage method could be employed.

The keyboard emulation block 28 is a combination of hardware and/or software that appears to the host system to be a keyboard input device. In an example where a speech controlled keyboard is embedded in an accessory that is connected to a host computer, the keyboard emulation block 28 is a HID keyboard device. All HID keyboards that are connected to a host have their output routed to the standard input. Therefore typing on the host's keyboard, or on any of the attached HID keyboards has the same effect and causes text input to the active application.

A HID device's functionality is defined by the "Usages" in its HID descriptor, and the standard Usages for HID keyboards are defined in the Universal Serial Bus HID Usage Tables. HID devices can implement a wide range of standard functions (mouse, keyboard, game-pad, etc.) and custom functions. Each device's specific functionality is defined by a HID descriptor, which is a report sent by the device to the host during the enumeration phase that occurs when the device is attached. The HID descriptor contains a hierarchical collection of "Usages" that specify the device's functionality. Usages are a standard syntax for describing the purpose and meaning of HID report data fields.

For USB HID devices, the basic USB functionality is described in the USB 2.0 and USB 3.0 specifications. The Device Class Definition for Human Interface Devices (HID) describes the HID-specific behavior and the basic structure of the HID descriptor and IN and OUT reports. The Universal Serial Bus HID Usage Tables defines Usages for a range of standard input and output devices, including keyboards (sections 3.5.1 and 10).

Bluetooth HID essentially uses the same HID descriptors and Usages as USB HID, but there are some differences in the way that data are physically transferred between the host and peripheral device. The Bluetooth Human Interface Device Profile defines how a device with Bluetooth wireless communications can support HID services over the Bluetooth protocol stack using the Logical Link Control and Adaptation Protocol (L2CAP) layer.

The HID protocol is specified in the Device Class Definition for HID, Version 1.11. This is a supplement to the USB specification. It provides HID manufacturers with the information necessary to build USB-compatible devices. The HID Usage Tables, version 1.12 defines constants that are used in HID reports for specific types of device. Appendix C of the Device Class Definition for HID specifies the design requirements for HID keyboards. Further information is provided in sections 3.5.1 and 10 of the HID Usage tables. Bluetooth devices use the same HID protocol and usage tables as USB devices, with Bluetooth-specific implementation details specified in the Bluetooth Human Interface Device Profile, Version 1.1. The aforementioned specifications and documents are hereby incorporated by reference.

HID devices send HID IN reports to the host, and receive HID OUT reports from the host, via the USB or Bluetooth communication channel. The IN and OUT reports are serial streams of digital data, whose bits are interpreted as defined in the HID specifications. When a USB or Bluetooth accessory first connects to the host, it sends enumeration data that describe its HID functionality.

USB and Bluetooth devices communicate with their host using a combination of dedicated hardware and software. A single accessory can implement multiple HID devices, alongside other functions such as audio devices and serial ports, over a single USB or Bluetooth channel. Therefore, in many cases, HID keyboard functionality can be added to a USB or Bluetooth headset without requiring any extra hardware. The software is simply modified to add new HID enumeration data, and to send the appropriate HID IN reports when key press events occur.

In one example, the speech-controlled keyboard is implemented in software on a desktop computer or mobile device. In some cases the operating system's API may support key press emulation. For example, the Win32 SendInput function in Microsoft Windows allows applications or services to emulate key press events. Third-party libraries like http://inputsimulator.codeplex.com provide a wrapper to SendInput to make it easier to use. In other cases the keyboard emulation could be implemented by writing a "fake" keyboard driver that routes text strings generated by the speech-controlled keyboard to the operating system's standard input stream.

Figure 3:
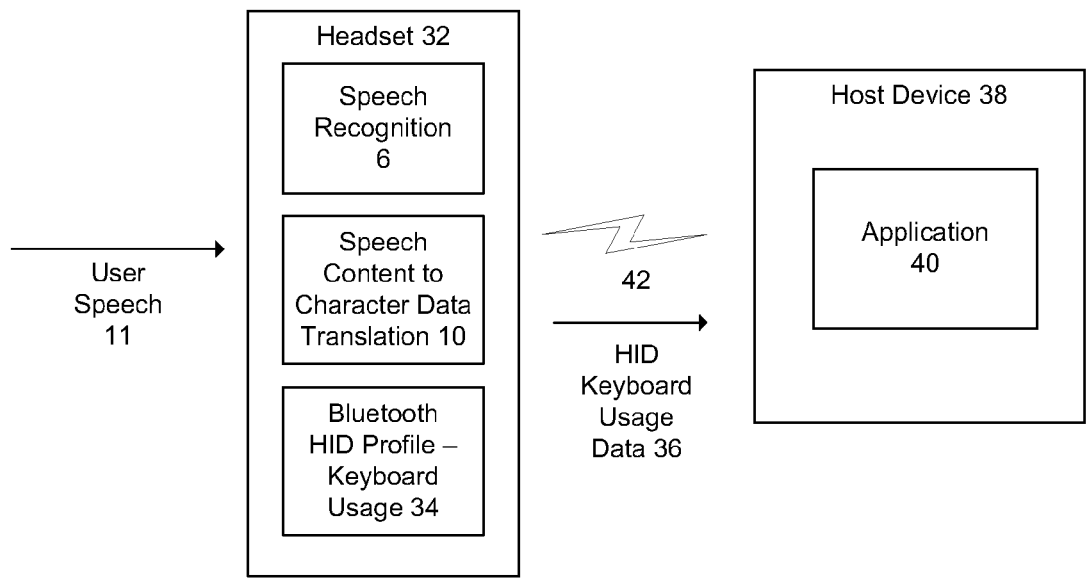
FIG. 3 illustrates an example implementation of the automatic character data entry system shown in FIG. 1.

FIG. 3 illustrates an example implementation of the character data entry system shown in FIG. 1. Speech recognition system 6 and speech content to character data translation system 10 are disposed at a headset 32. Headset 32 implements a Bluetooth HID Profile—Keyboard Usage system 34. Headset 32 is connectible to a host device 38 having an application 40 via a communications link 42. In one example, the application 40 may be implemented as a standalone computer program configured to execute on host device 38. Although shown as a wireless link, communications link 42 may be a wired or wireless link in further examples. For example, host device 38 may be a personal computer, notebook computer, or smartphone.

Speech content to character data translation system 10 receives user speech content from speech recognition system 6, translates the speech content to a character data, and outputs HID keyboard usage data 36 corresponding to the character data as described herein. In one example, speech content to character data translation system 10 correlates the user speech content to a character data previously stored in headset memory. Headset 32 transmits the character data as a human interface device keyboard usage data 36 to host device 38. In one example, headset 32 includes a human interface device keyboard emulation application. The human interface device keyboard emulation application is integrated with speech content to character data translation system 10 in one example.

In one example, the human interface device keyboard usage data 36 is in accordance with the Bluetooth HID profile keyboard usage table. In an example where headset 32 implements a USB HID Protocol instead of a Bluetooth HID Profile, the human interface device keyboard usage data 36 is in accordance with the USB HID protocol keyboard usage table.

Application 40 receives HID keyboard usage data 36 from headset 32. In one example implementation, the application 40 automatically enters the character data in one or more data fields displayed to a user on a display of host device 38. In one example, the character data is a first character string to be automatically entered into a first data field and a second character string to be automatically entered into a second data field.

Figure 4:
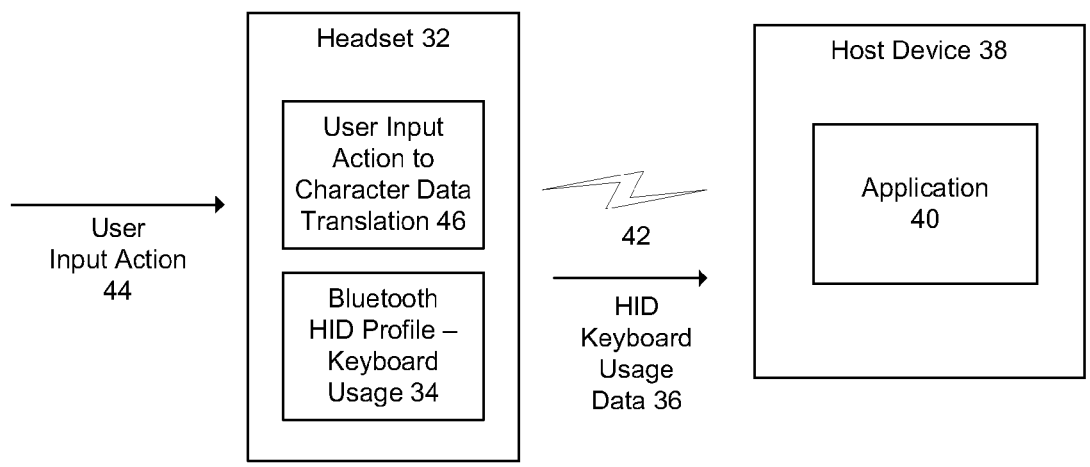
FIG. 4 illustrates an example implementation of the system shown in FIG. 1 or FIG. 2.

FIG. 4 illustrates an example implementation of the system shown in FIG. 1 or FIG. 2. A user input action to character data translation system 46 is disposed at a headset 32. Headset 32 implements a Bluetooth HID Profile—Keyboard Usage system 34. Headset 32 is connectible to a host device 38 having an application 40 via a communications link 42. Host device 38 is similar to that as described above in reference to FIG. 3.

User input action to character data translation system 46 receives a user input action 44 at a headset user interface, translates the user action to a character data, and outputs HID keyboard usage data 36 corresponding to the character data as described herein. In one example, user input action to character data translation system 46 correlates the user action to a character data previously stored in headset memory. For example, the user input action may be a headset button press, touch pad input, or speech input.

Headset 32 transmits the character data as a human interface device keyboard usage data 36 to host device 38. In one example, headset 32 includes a human interface device keyboard emulation application. The human interface device keyboard emulation application is integrated with user input action to character data translation system 46 in one example.

In one example, the human interface device keyboard usage data 36 is in accordance with the Bluetooth HID profile keyboard usage table. In an example where headset 32 implements a USB HID Protocol instead of a Bluetooth HID Profile, the human interface device keyboard usage data 36 is in accordance with the USB HID protocol keyboard usage table.

Application 40 receives HID keyboard usage data 36 from headset 32. In one example implementation, the application 40 automatically enters the character data in one or more data fields displayed to a user on a display of host device 38. In one example, the character data is a first character string to be automatically entered into a first data field and a second character string to be automatically entered into a second data field.

Figure 5:
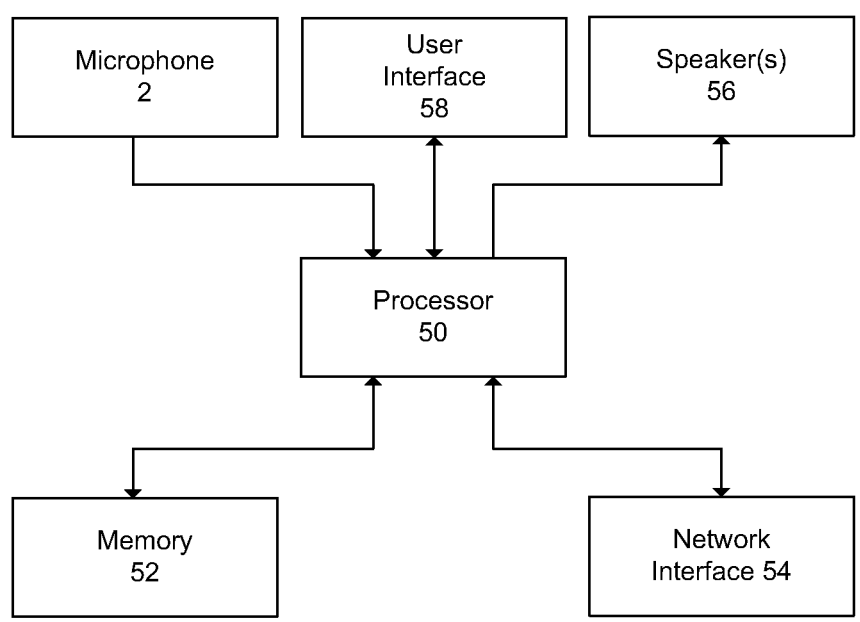
FIG. 5 illustrates a headset in one example configured to implement one or more of the examples described herein.

FIG. 5 illustrates a headset in one example configured to implement one or more of the examples described herein. Examples of headset 32 include telecommunications headsets. The term "headset" as used herein encompasses any head-worn device operable as described herein.

In one example, a headset 32 includes a microphone 2, user interface 58, speaker(s) 56, a memory 52, and a network interface 54. Headset 32 includes a digital-to-analog converter (D/A) coupled to speaker(s) 56 and an analog-to-digital converter (A/D) coupled to microphone 2. Microphone 2 detects sound and outputs a sound signal. In one example, the network interface 54 is a wireless transceiver or a wired network interface. In one implementation, speaker(s) 56 include a first speaker worn on the user left ear to output a left channel of a stereo signal and a second speaker worn on the user right ear to output a right channel of the stereo signal. User interface 58 may include various means to receive user actions to operate the headset, such as buttons or keys, or capacitive touch sensors. Input buttons may include for example on/off buttons or arrow keys.

Memory 52 represents an article that is computer readable. For example, memory 52 may be any one or more of the following: random access memory (RAM), read only memory (ROM), flash memory, or any other type of article that includes a medium readable by processor 50. Memory 52 can store computer readable instructions for performing the execution of the various method embodiments of the present invention. In one example, the processor executable computer readable instructions are configured to perform part or all of a process such as that shown in FIGS. 9-11. Computer readable instructions may be loaded in memory 52 for execution by processor 50.

Network interface 54 allows headset 32 to communicate with other devices. Network interface 54 may include a wired connection or a wireless connection. Network interface 54 may include, but is not limited to, a wireless transceiver, an integrated network interface, a radio frequency transmitter/receiver, a USB connection, or other interfaces for connecting headset 32 to a telecommunications network such as a Bluetooth network, cellular network, the PSTN, or an IP network. In an example where network interface 54 is a wireless Bluetooth transceiver, headset 32 is operable to transmit a Bluetooth human interface device profile keyboard usage data in accordance with the Bluetooth HID Profile. In an example where network interface 54 is a USB interface, headset 32 is operable to transmit a USB human interface device protocol keyboard usage data in accordance with the USB HID Protocol.

In one example operation, the headset 32 includes a processor 50 configured to execute one or more applications and operate the headset to transmit a human interface device protocol keyboard data over the network interface 54 to a computing device. A headset memory stores a word or phrase paired with a pre-determined character data. The processor 50 is further configured to transmit a human interface device protocol keyboard data corresponding to the character data following detection of the word or phrase in the user speech paired with the pre-determined character data. As used herein, the term "phrase" may refer to a single word or multiple words. In one example, the word or phrase paired with a pre-determined character data differs from the pre-determined character data as shown in FIG. 6 discussed below.

FIG. 6 is a table 600 illustrating translation of user speech content to character data. In one example, table 600 may be implemented as a look-up table stored in a device memory. Such a table 600 may be generated for each registered user in the system.

As shown in table 600, each word or phrase is paired with a pre-determined character data. In one example, the word or phrase paired with a pre-determined character data differs from the pre-determined character data. The pre-determined character data is entered into table 600 during an initial configuration mode whereby the user pairs words or phrases with character data.

For example, a user may speak the phrase "Work Email Password". The user speech is recognized using speech recognition (e.g., speech-to-text) as the speech content "Work Email Password". Utilizing table 600, the speech content "Work Email Password" is translated to the character data "JohnS<tab>passport342" utilizing the systems and processes described herein. In this example, the character data is a first character string corresponding to a headset user name (e.g., "JohnS"), a TAB key press keyboard command, and a second character string corresponding to a headset user password (e.g., "passport342").

In a further example from table 600, a user may speak the phrase "Credit Card 1". The user speech is recognized using speech recognition (e.g., speech-to-text) as the speech content "Credit Card 1". Utilizing table 600, the speech content "Credit Card 1" is translated to the character data "4205100479653985<tab>587<tab>0514" utilizing the systems and processes described herein. In this example, the character data is a first character string corresponding to a credit card number (e.g., "4205100479653985"), a TAB key press keyboard command, a second character string corresponding to a security code (e.g., "587"), a TAB key press keyboard command, and a third character string corresponding to an expiration date (e.g., "0514").

Figure 7:
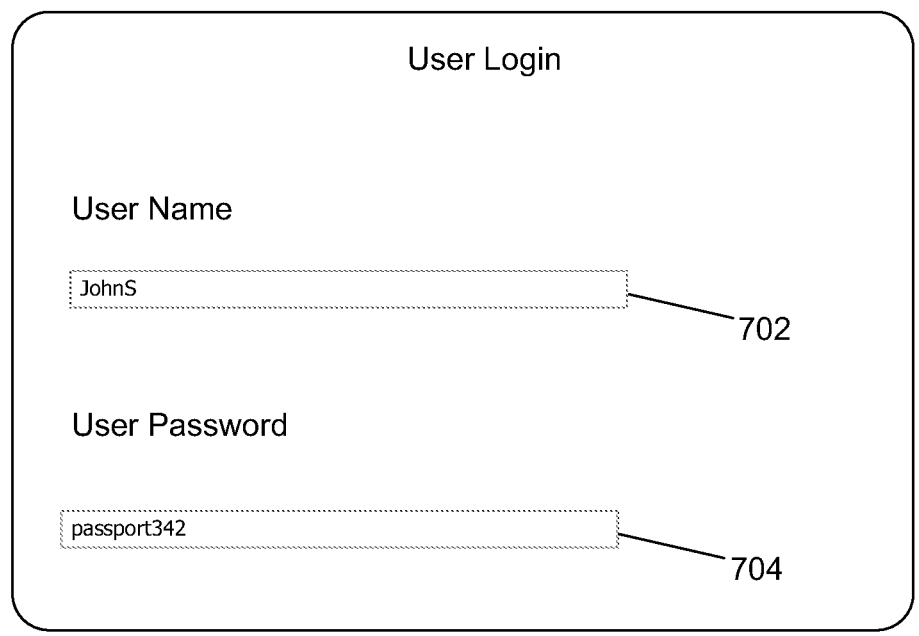
FIG. 7 is a display screen illustrating automatic character data entry into data fields in one example from the table shown in FIG. 6.

FIG. 7 is a display screen 700 illustrating automatic character data entry into data fields in one example from the table 600 shown in FIG. 6. For example, display screen 700 may be located at a host device 38. Display screen 700 shows two data fields, where a first data field 702 is for entry of a user name and a second data field 704 is for entry of a user password. In one example, utilizing the systems and processes described herein, where the user speaks the words "Work Email Password", the two data fields 702 and 704, respectively, are automatically filled in with "JohnS" and "passport342" in accordance with the data found in table 600. The TAB key press keyboard command is utilized to move data entry from data field 702 and data field 704 and separate the character data to be entered in each data field. In one example, the character data entered in the User Password field is masked from view using, for example, asterisks.

FIG. 8 is a display screen illustrating automatic character data entry into data fields in a further example from the table 600 shown in FIG. 6. For example, display screen 800 may be located at a host device 38. Display screen 800 shows three data fields, where a first data field 802 is for entry of a user credit card number, a second data field 804 is for entry of the credit card Security Code, and a third data field 806 for entry of the credit card Expiration Date. In one example, utilizing the systems and processes described herein, where the user speaks the words "Credit Card 1", data field 802 is automatically filled in with "4205100479653985", data field 804 is automatically filled in with "587", and data field 806 is automatically filled in with "0514" in accordance with the data found in table 600.

Figure 9:
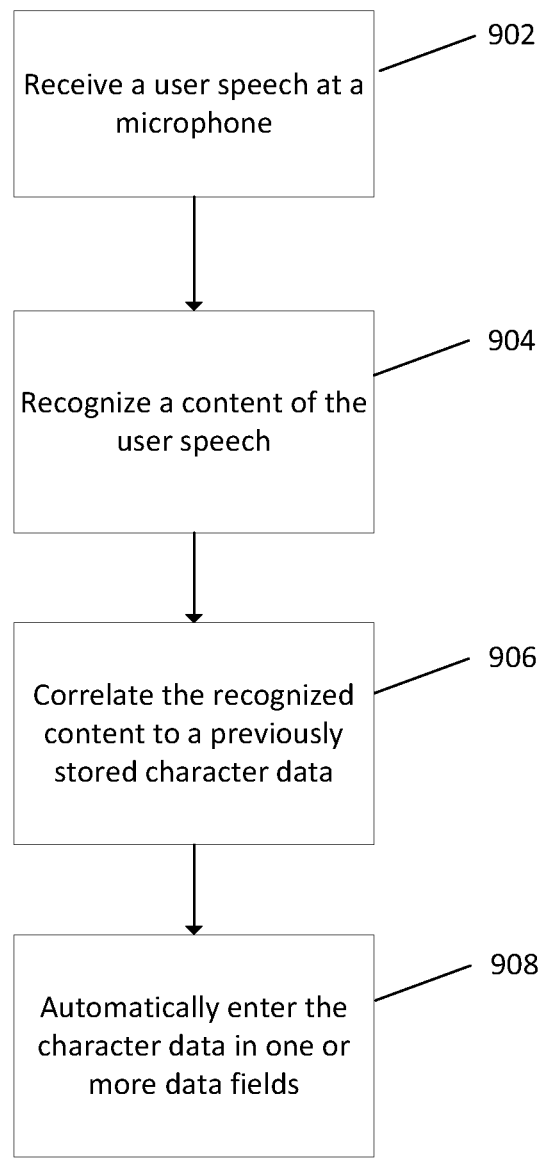
FIG. 9 is a flow diagram illustrating a method for automatic character data entry in one example.

FIG. 9 is a flow diagram illustrating a method for automatic character data entry in one example. At block 902, a user speech is received at a microphone. At block 904, a content of the user speech is recognized.

At block 906, the recognized content is correlated to a previously stored character data. In one example, the character data is a first character string to be automatically entered into a first data field of the one or more data fields and a second character string to be automatically entered into a second data field of the one or more data fields. In one example, the character data is a password. In one example, the character data is a first character string corresponding to a user name, a TAB key press keyboard command, and a second character string corresponding to a user password.

At block 908, the character data is automatically entered into one or more data fields. In one example, automatically entering the character data in the one or more data fields includes emulating a keyboard input to automatically type the character data. In one example, the one or more data fields are displayed to the user on a web page.

In one example, the method further includes receiving the character data from a device implementing a Universal Serial Bus (USB) Human Interface Device Protocol or a Bluetooth Human Interface Device Profile. For example, the device is a Bluetooth headset operable as a Bluetooth human interface device with keyboard usage functionality to output the character data. In a further example, the device is a headset operable as a USB human interface device with keyboard usage functionality to output the character data.

Figure 10:
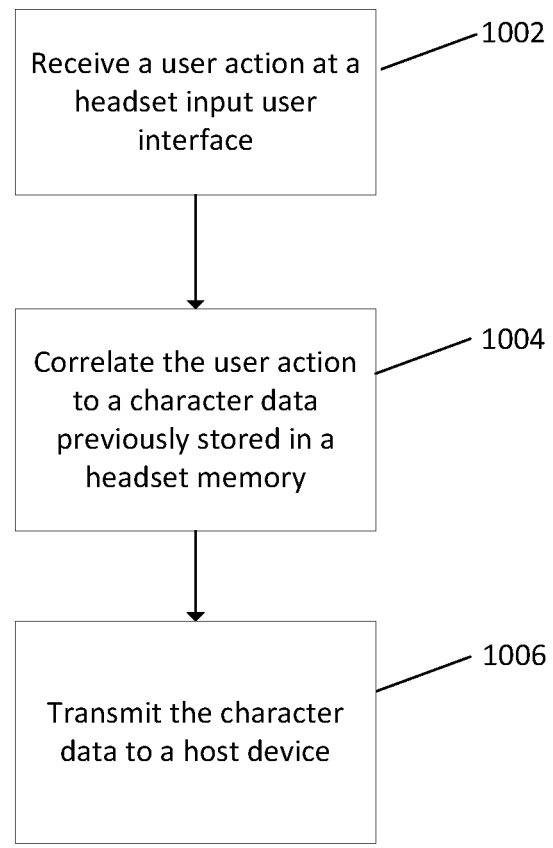
FIG. 10 is a flow diagram illustrating a method for transmitting character data to a host device in one example.

FIG. 10 is a flow diagram illustrating a method for transmitting character data to a host device in one example. At block 1002, a user action is received at a headset input user interface. In one example, the user action is a key press at the headset. In one example, the user action is a user speech detected at a headset microphone.

At block 1004, the user action is correlated to a character data previously stored in a headset memory. In one example, the character data is a first character string to be automatically entered into a first data field of the one or more data fields and a second character string to be automatically entered into a second data field of the one or more data fields. In one example, the character data is a password. In one example, the character data is a first character string corresponding to a headset user name, a TAB key press keyboard command, and a second character string corresponding to a headset user password.

At block 1006, the correlated character data is transmitted to a host device. In one example, the character data is configured as an output from a keyboard human interface device. The character data is configured to be automatically entered in one or more data fields. In one example, the one or more data fields are displayed to the user on a browser web page at the host device.

Figure 11:
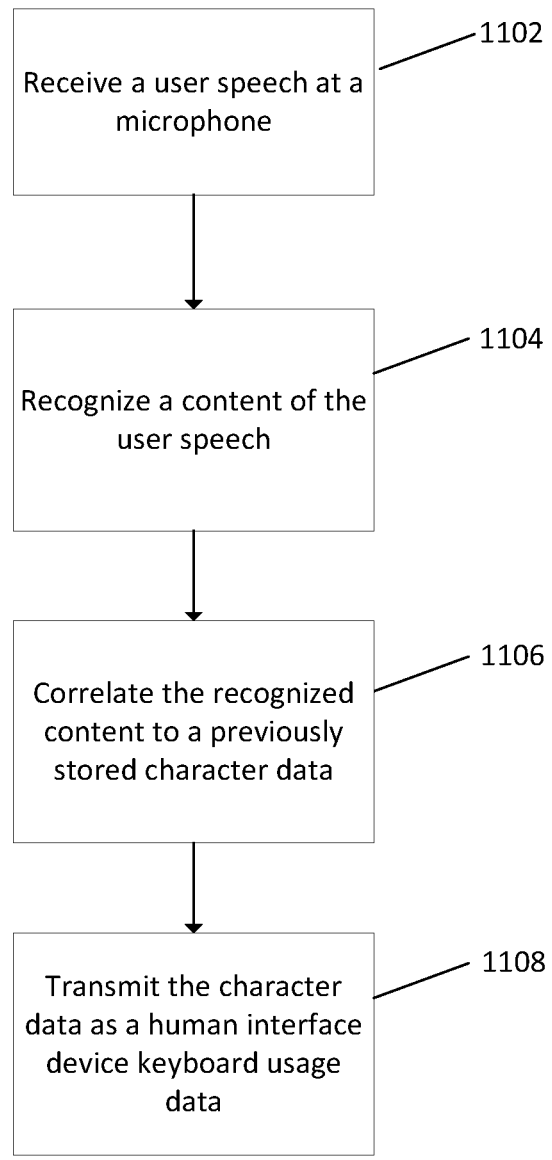
FIG. 11 is a flow diagram illustrating a method for transmitting character data in one example.

FIG. 11 is a flow diagram illustrating a method for transmitting character data in one example. At block 1102, a user speech is received at a microphone. At block 1104, a content of the user speech is recognized. At block 1106, the content is correlated to a character data previously stored in memory. In one example, the character data is a first character string to be automatically entered into a first data field of the one or more data fields and a second character string to be automatically entered into a second data field of the one or more data fields.

At block 1108, the character data is transmitted as a human interface device keyboard usage data. In one example, the human interface device keyboard usage data is in accordance with the USB HID protocol keyboard usage table. In one example, the human interface device keyboard usage data is in accordance with the Bluetooth HID profile keyboard usage table. In one example, the method further includes automatically entering the character data in one or more data fields displayed to a user on a computing device display.

While the exemplary embodiments of the present invention are described and illustrated herein, it will be appreciated that they are merely illustrative and that modifications can be made to these embodiments without departing from the spirit and scope of the invention. Certain examples described utilize headsets which are particularly advantageous for the reasons described herein. In further examples, other devices, such as other body worn devices may be used in place of headsets, including wrist-worn devices. In further examples, other computer peripherals such as wireless or USB keyboards, mice and hubs may be used in place of headsets to implement speech-triggered or gesture-triggered automatic character data entry. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
receiving a user speech at a microphone;
recognizing a content of the user speech;
correlating the content to a character data previously stored in a memory prior to receiving the user speech, the character data for input into a user interface input data field; and
automatically entering the character data previously stored in the memory prior to receiving the user speech a first data field and a second data field, wherein the character data comprises a first character string to be automatically entered into the first data field and a second character string to be automatically entered into the second data field.

2. The one or more non-transitory computer-readable storage media of claim 1, wherein automatically entering the character data in the first data field and the second data field comprises emulating a keyboard input to automatically type the character data.

3. The one or more non-transitory computer-readable storage media of claim 1, wherein the operations further comprise: receiving the character data from a device implementing a Universal Serial Bus (USB) Human Interface Device Protocol or a Bluetooth Human Interface Device Profile.

4. The one or more non-transitory computer-readable storage media of claim 3, wherein the device is a Bluetooth headset operable as a Bluetooth human interface device with keyboard usage functionality to output the character data.

5. The one or more non-transitory computer-readable storage media of claim 3, wherein the device is a headset operable as a USB human interface device with keyboard usage functionality to output the character data.

6. The one or more non-transitory computer-readable storage media of claim 1, wherein the first data field and the second data field are displayed to a user on a web page.

7. The one or more non-transitory computer-readable storage media of claim 1, wherein the character data comprises a password.

8. The one or more non-transitory computer-readable storage media of claim 1, wherein the character data comprises a first character string corresponding to a user name, a TAB key press keyboard command, and a second character string corresponding to a user password.

9. A method for operating a headset as a keyboard comprising:
   receiving a user action at a headset input user interface;
   correlating the user action to a character data previously stored in a headset memory prior to receiving the user action, the character data to be automatically entered into one or more user interface input data fields; and
   transmitting the character data to a host device for automatic entry into a first data field and a second data field, wherein the character data comprises a first character string to be automatically entered into the first data field and a second character string to be automatically entered into the second data field.

10. The method of claim 9, wherein the user action is a user speech detected at a headset microphone.

11. The method of claim 9, wherein the character data is configured as an output from a keyboard human interface device.

12. The method of claim 9, wherein the first data field and the second data field are displayed to a user on a browser web page at the host device.

13. The method of claim 9, wherein the character data comprises a password.

14. The method of claim 9, wherein the character data comprises a first character string corresponding to a headset user name, a TAB key press keyboard command, and a second character string corresponding to a headset user password.

15. A device comprising:
   a communications interface;
   a microphone configured to detect a user speech;
   a processor; and
   a memory comprising:
      a word or phrase paired with a character data previously stored in the memory prior to receiving the user speech, the character data for input into a user interface input data field; and
      an application program configured to transmit a human interface device protocol keyboard data over the communications interface to a computing device, wherein the application is further configured to transmit a human interface device protocol keyboard data corresponding to the character data following detection of the word or phrase in the user speech paired with the character data, wherein the character data comprises a first character string to be automatically entered into a first data field and a second character string to be automatically entered into a second data field, wherein the first data field and the second data field are associated with an application being executed at the computing device.

16. The device of claim 15, wherein the communications interface is a wireless Bluetooth transceiver and the human interface device protocol keyboard data is a Bluetooth human interface device profile keyboard usage data.

17. The device of claim 15, wherein the communications interface is a USB interface and the human interface device protocol keyboard data is a USB human interface device protocol keyboard usage data.

18. The device of claim 15, wherein the first data field and the second data field are displayed to a user on a browser web page on a display of the computing device.

19. The device of claim 15, wherein the character data comprises a password.

20. The device of claim 15, wherein the character data comprises a first character string corresponding to a headset user name, a TAB key press keyboard command, and a second character string corresponding to a headset user password.

* * * * *